(12) United States Patent
Finkner et al.

(10) Patent No.: US 7,669,394 B2
(45) Date of Patent: Mar. 2, 2010

(54) PROPULSION AND STABILIZATION STRUTS FOR MOWER CUTTING DECK

(75) Inventors: Steven C. Finkner, Adams, NE (US); Kermit A. Wolff, Lincoln, NE (US)

(73) Assignee: Exmark Mfg. Co., Inc., Beatrice, NE (US)

( * ) Notice: Subject to any disclaimer, the term of this patent is extended or adjusted under 35 U.S.C. 154(b) by 0 days.

(21) Appl. No.: 12/009,632

(22) Filed: Jan. 20, 2008

(65) Prior Publication Data

US 2009/0183485 A1    Jul. 23, 2009

(51) Int. Cl.
*A01D 34/00* (2006.01)
(52) U.S. Cl. ........................................ 56/14.9
(58) Field of Classification Search ................. 56/14.9, 56/17.1, 15.9, 15.8, 15.7, 14.7, 16.3, 10.8, 56/121.46, 16.7
See application file for complete search history.

(56) References Cited

U.S. PATENT DOCUMENTS

| | | | | |
|---|---|---|---|---|
| 3,874,150 A | * | 4/1975 | Boeck | 56/17.1 |
| 3,948,025 A | * | 4/1976 | Erdman | 56/10.1 |
| 4,869,057 A | * | 9/1989 | Siegrist | 56/15.9 |
| 4,882,898 A | * | 11/1989 | Samejima et al. | 56/208 |
| 5,025,617 A | * | 6/1991 | Kuhn et al. | 56/15.6 |
| 5,483,789 A | * | 1/1996 | Gummerson | 56/15.5 |
| 5,937,625 A | * | 8/1999 | Seegert | 56/15.6 |
| 5,956,932 A | * | 9/1999 | Schmidt | 56/15.6 |
| 6,223,510 B1 | * | 5/2001 | Gillins et al. | 56/15.1 |
| 6,293,077 B1 | * | 9/2001 | Plas et al. | 56/17.1 |
| 6,470,660 B1 | * | 10/2002 | Buss et al. | 56/15.9 |
| 6,584,756 B2 | * | 7/2003 | Buss | 56/15.6 |
| 6,679,037 B1 | * | 1/2004 | Hitt et al. | 56/15.6 |
| 6,912,833 B2 | * | 7/2005 | Buss | 56/15.6 |
| 6,935,093 B2 | | 8/2005 | Velke et al. | |
| 6,988,351 B2 | * | 1/2006 | Schick et al. | 56/15.9 |
| 7,028,456 B2 | * | 4/2006 | Thatcher et al. | 56/15.6 |
| 7,197,863 B1 | * | 4/2007 | Sugden | 56/15.9 |
| 2002/0059788 A1 | * | 5/2002 | Velke et al. | 56/14.7 |
| 2003/0188905 A1 | * | 10/2003 | Buss | 180/200 |
| 2004/0093840 A1 | * | 5/2004 | Velke et al. | 56/15.8 |

OTHER PUBLICATIONS

Wikipedia page showing prior art automotive panhard rod for axle.

* cited by examiner

*Primary Examiner*—Árpád Fábián-Kovács
(74) *Attorney, Agent, or Firm*—James W. Miller

(57) ABSTRACT

A mower has a frame that supports a rotary cutting deck. A height of cut system is provided for adjusting the height of cut of the deck. In addition, two longitudinal struts and a lateral strut connect between the frame and the rear of the deck. The longitudinal struts propel the deck in forward and reverse directions while the lateral strut provides lateral stabilization to the deck to prevent excessive side-to-side motion of the deck. Each of the struts is a simple elongated rod or bar having a hub at either end that contains a rubber bushing allowing three-axis motion. Each strut is pivotally connected at each hub to corresponding portions of the frame or the deck.

9 Claims, 8 Drawing Sheets

PROPULSION AND STABILIZATION STRUTS FOR MOWER CUTTING DECK

TECHNICAL FIELD

This invention relates to a rotary cutting deck mounted to and carried by a mower. More particularly, this invention relates to a plurality of struts extending between the mower frame and the cutting deck to propel the cutting deck and to laterally stabilize the cutting deck against undue side-to-side movement.

BACKGROUND OF THE INVENTION

Riding mowers having a zero radius turn (ZRT) capability are well known in the mowing art. Such mowers have a frame that carries a power source, such as an internal combustion engine, for propelling the frame over the ground and for providing power for mowing. Two powered rear drive wheels are carried on the frame with the front of the frame having a pair of unpowered front wheels, the wheels collectively supporting the frame for rolling over the ground. Often, the unpowered front wheels are caster wheels.

The rear drive wheels in a ZRT mower are individually powered by separate hydraulic drive motors that receive pressurized hydraulic fluid from a hydraulic system driven by the power source of the mower. The drive motors are individually controlled by separate control levers placed adjacent an operator's seat provided on the mower frame. The mower is steered by advancing one lever farther than the other to cause one drive motor, and thus the drive wheel on one side of the mower, to rotate faster than the other drive motor and drive wheel, thereby causing the vehicle to turn. Very sharp spin or ZRT type turns can be accomplished by advancing one control lever forwardly while pulling the other control lever rearwardly to cause the drive wheels on the opposite sides of the mower to simultaneously rotate in opposite directions.

A rotary cutting deck is carried at the front of the mower. The cutting deck usually houses a plurality of cutting blades that rotate about substantially vertical axes to cut grass in horizontal cutting planes. The blades are typically staggered relative to one another with a center blade being offset forwardly of a pair of side blades located on either side of the center blade. This allows the orbits of the cutting blades to overlap without having the blades contact one another, thus avoiding the need for timing the rotation of the blades. As the mower is driven over the ground and the blades are rotated, the blades cut a relatively large unbroken swath of grass during each pass of the mower. Exmark Mfg. Co., Inc. manufactures and sells ZRT mowers of this type under its Lazer Z brand name.

To change the height of cut (HOC) of the grass, the cutting deck is vertically moved up and down relative to the mower frame and thus relative to the ground to change the height of the cutting blades relative to the ground. In many known mowers, the HOC system used to do this includes multiple suspension links to the cutting deck. These movable links move up and down simultaneously with one another under the action of a single control lever. The control lever has a plurality of discrete adjusted positions relative to the mower frame, often established by the control lever engaging against a pin, to allow the height of cut of the cutting deck to be adjusted in a plurality of discrete increments. The height of cut is adjusted by changing the location of the pin within an array of adjustment holes provided therefor on the mower frame. The pin is selectively inserted by the operator into whichever adjustment hole corresponds to the desired height of cut.

While the HOC system suspends the cutting deck from the mower frame, it is not the primary propulsion linkage to the frame. In mowers of this type, parallel struts have front ends pivotally connected to the rear of the cutting deck. The rear ends of the struts pivotally connect to some portion of the frame behind the cutting deck. The struts are generally horizontal. The purpose of the struts is to transmit propulsive force from the motion of the frame to the cutting deck, thus propelling the cutting deck forwardly and rearwardly as the mower frame moves forwardly and rearwardly. The struts are also desirably long enough to permit a wide range of vertical motion of the cutting deck, such as when the height of cut is adjusted over its maximum range of travel or the cutting deck floats relative to the mower frame during operation of the mower to adapt to ground contours.

In known mowers using a pair of parallel struts, the front ends of the struts are formed with a wide horizontal sleeve that is pivotally mounted to the deck on a pivot pin. The rear of the cutting deck has a forked mount that includes a pair of spaced mounting arms with the pivot pin extending through the mounting arms and the sleeve on the front end of the strut being received between the mounting arms. The use of a wide sleeve constrained between a pair of mounting arms provides lateral or side-to-side stabilization of the cutting deck. In other words, the interaction of the sleeve, pin, and mounting arms prevents the cutting deck from moving or swaying too much in a lateral or side-to-side direction.

However, this lateral stabilization structure is prone to wear due to the side loads involved. Over time, this structure wears and loosens up and begins to permit the deck to excessively sway or move from side-to-side. The structure can be rebuilt or repaired, but this is a disadvantage. It is also a disadvantage to simply continue to use the cutting deck with too much side-to-side motion as the quality of cut can be adversely affected.

Another disadvantage of prior art struts is the use of solid pivot pins to connect opposite ends of the struts to the deck and the frame. Such solid pivot pins transmit vibration and shock loads from the deck to the frame which can be felt by and affect the operator. For example, if the deck strikes an object, the shock load from the impact will be transmitted back through the struts to the frame and to the operator who is carried on a seat on the frame. In addition, the use of solid pins to connect the struts is relatively noisy as the struts pivot up and down on the pins during operation of the mower and as the pins move slightly in their supports as the deck shifts laterally during maneuvering. This noise can also be annoying to the operator or bystanders.

In addition, known strut designs are relatively difficult to assemble and require close tolerances. The front of each strut includes the aforementioned sleeve that is desirably closely received between the arms of the forked deck mount in order to provide sufficient lateral stabilization to the deck. However, it may be the case that after one strut is assembled in its forked mount, the placement of the front end of the other strut might be off when it comes to dropping it down between the arms of the other forked deck mount. Tolerances must be closely controlled to prevent this from happening and even then misalignment can still occur. This requires the parts to be moved or replaced in order to allow assembly to be completed, which is obviously a disadvantage.

SUMMARY OF THE INVENTION

One aspect of this invention relates to an improved mower of the type having a mower frame. A rotary cutting deck is carried by the frame. A height of cut system is provided for vertically moving the deck upwardly and downwardly relative to the frame to adjust the height of cut of the grass. In addition to the height of cut system, various struts propel and laterally stabilize the deck on the frame. The struts comprise a pair of laterally spaced, longitudinal struts pivotally connecting the frame to a rear of the deck for propelling the deck in forward and reverse directions as the frame moves in forward and reverse directions. At least one lateral strut pivotally connects the rear of the deck and the frame for providing lateral stabilization to the deck.

Another aspect of this invention relates to an improved mower of the type having a mower frame. A rotary cutting deck is carried by the frame. A plurality of struts extends between the deck and the frame. The improvement relates to the struts and comprises at least one generally longitudinally extending strut having opposite first and second ends, wherein a first end of each longitudinal strut is pivotally connected to the frame by a first pivot connection and a second end of each longitudinal strut is pivotally connected to the deck by a second pivot connection, and wherein the first and second pivot connections of each longitudinal strut are longitudinally spaced apart relative to a forward direction of motion of the frame such that each longitudinal strut propels the deck in forward and reverse directions from forward and reverse movement of the frame. The struts also comprise at least one generally laterally extending strut having opposite first and second ends. A first end of each lateral strut is pivotally connected to the frame by a first pivot connection and a second end of each lateral strut is pivotally connected to the deck by a second pivot connection. The first and second pivotal connections of each lateral strut are laterally spaced apart relative to the frame to laterally stabilize the deck on the frame. An elastomeric member is provided in at least one of the pivot connections of each strut.

Yet another aspect of this invention relates to an improved mower of the type having a mower frame. A rotary cutting deck is carried by the frame. A plurality of struts extends between the deck and the frame. The improvement relates to the struts and comprises at least three struts extending between the deck and the frame. At least one strut extends sufficiently longitudinally between the deck and the frame to propel the deck in forward and reverse directions as the frame moves in forward and reverse directions. At least one strut extends sufficiently laterally between the deck and the frame to stabilize the deck against lateral motion relative to the frame. At least one end of each strut includes a pivot connection permitting movement of the strut along three axes at the one end of the strut.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
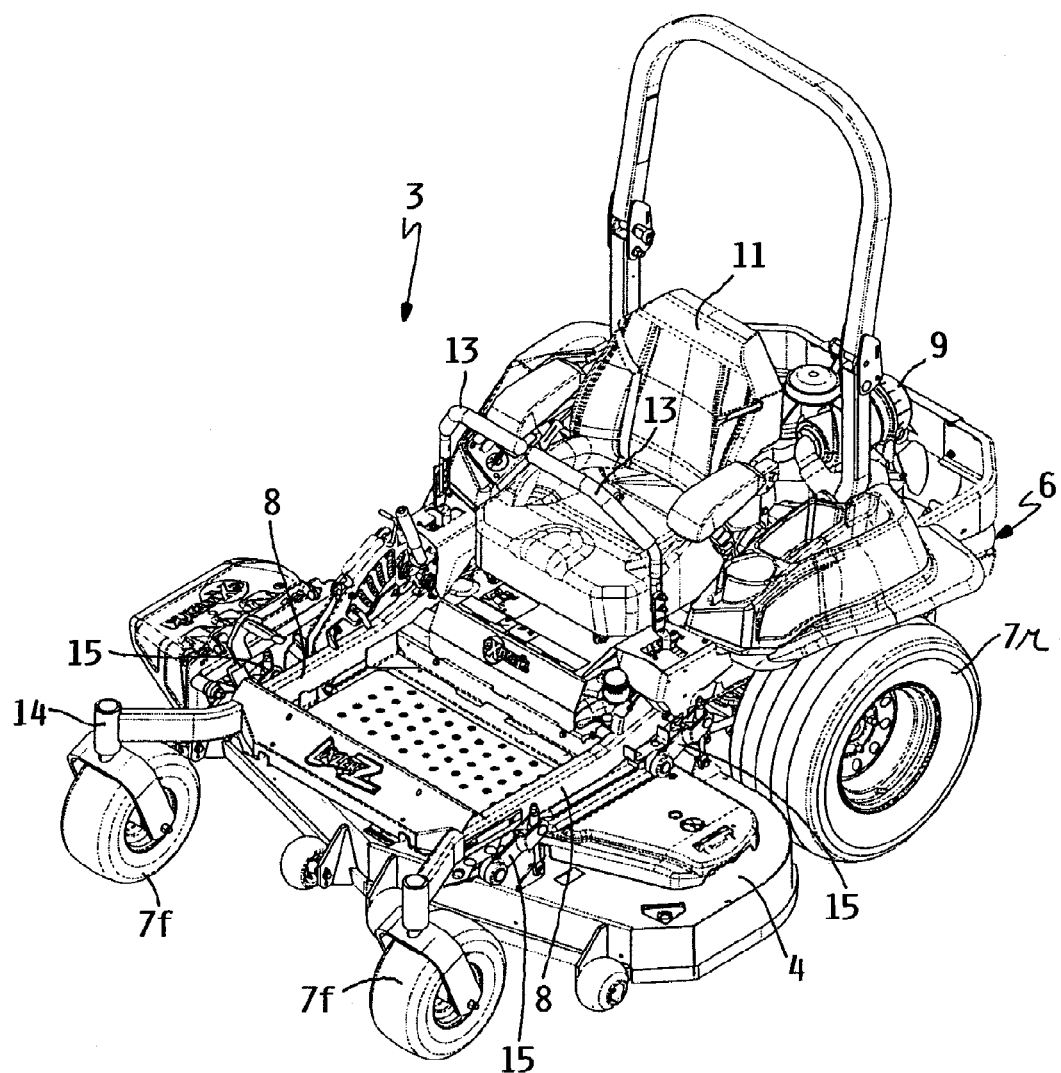
FIG. 1 is perspective view of a mower having the propulsion and stabilization struts of this invention extending between the frame of the mower and the cutting deck.

Referring first to FIG. 1, a mower 3 has a frame 6 that supports a rotary cutting deck 4 adjacent the front thereof. Frame 6 is supported for rolling over the ground by a pair of rear drive wheels 7r, only one of which is shown in FIG. 1, and by a pair of front caster wheels 7f. A power source, such as in internal combustion engine 9, is carried at the rear of frame 6. An operator's seat 11 is placed forward of engine 9 and generally between rear drive wheels 7r for carrying a seated operator. Two control levers 13 are used by the operator to control the steering and propulsion provided by rear drive wheels 7r in a manner well known for zero radius turn (ZRT) mowers. Other operational controls are provided for starting and stopping the operation of deck 4. Mower 3 as illustrated herein is similar to, but is not limited to, the Lazer Z mowers manufactured and sold by Exmark Mfg. Co., Inc., the assignee of this invention.

Figure 2:
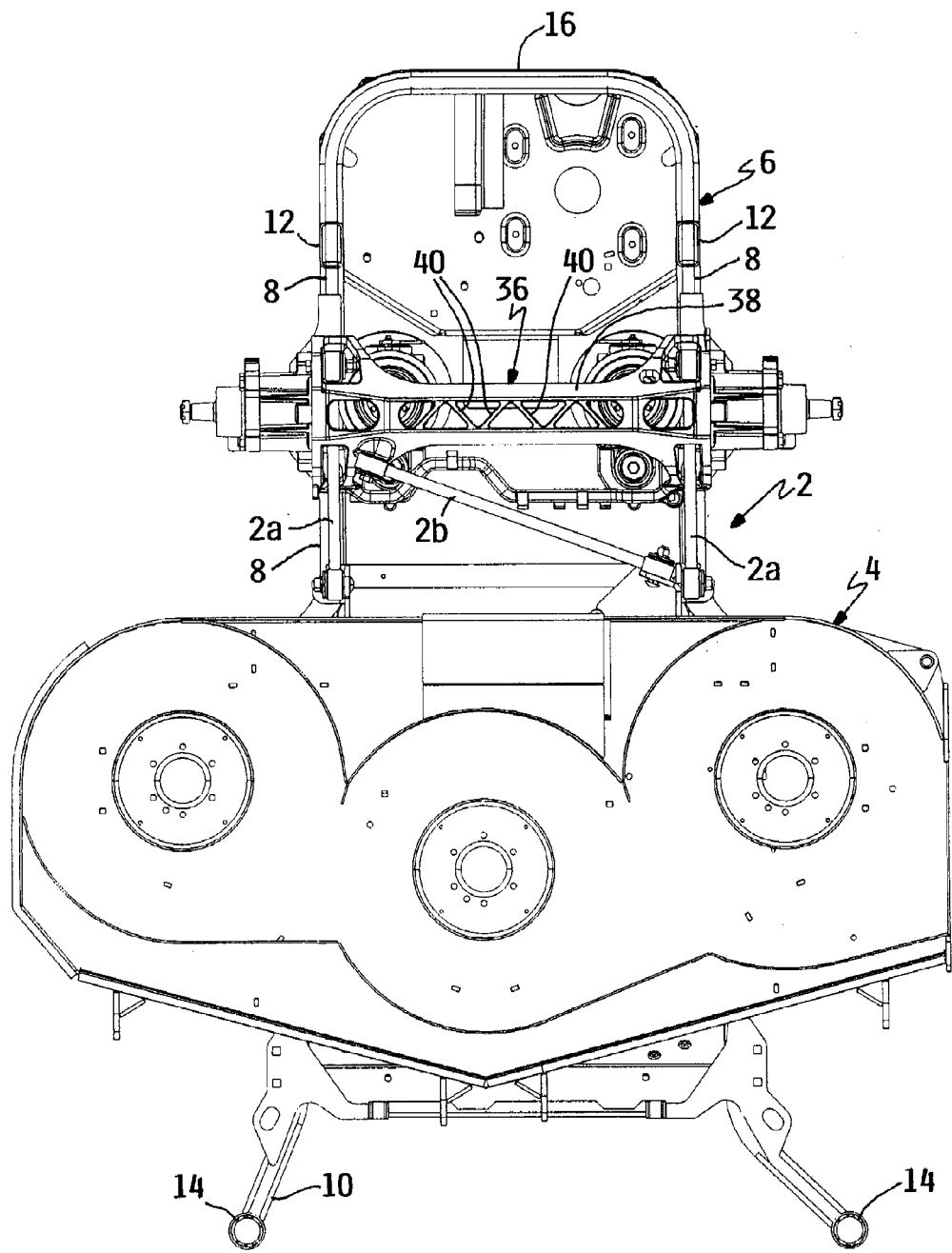
FIG. 2 is a bottom plan view of a portion of the frame of a mower and of a portion of a cutting deck particularly illustrating the propulsion and stabilization struts of this invention.

Referring now to FIG. 2, one embodiment of a set of struts according to this invention is generally illustrated as 2. Struts 2 longitudinally propel deck 4 forwardly and rearwardly from frame 6 while at the same time preventing undue or excessive side-to-side motion of deck 4.

A separate height of cut (HOC) system also suspends deck 4 beneath frame 6 to adjust the height of cut of the grass being mowed. This HOC system is in addition to struts 2 of this invention. The HOC system includes multiple pivotal suspension links 15 between frame 6 and deck 4. Pivotal links 15 pivot up and down simultaneously with one another under the action of a single control lever (not shown). The control lever has a plurality of discrete adjusted positions relative to frame 6, established by the control lever engaging against a pin, to allow the height of cut of deck 4 to be adjusted in a plurality of discrete increments. The height of cut is adjusted by changing the location of the pin within an array of adjustment holes provided therefore on frame 6. The pin is selectively inserted by the operator into whichever adjustment hole corresponds to the desired height of cut. This type of HOC system is well known in the mower art and need not be further described herein.

Figure 3:
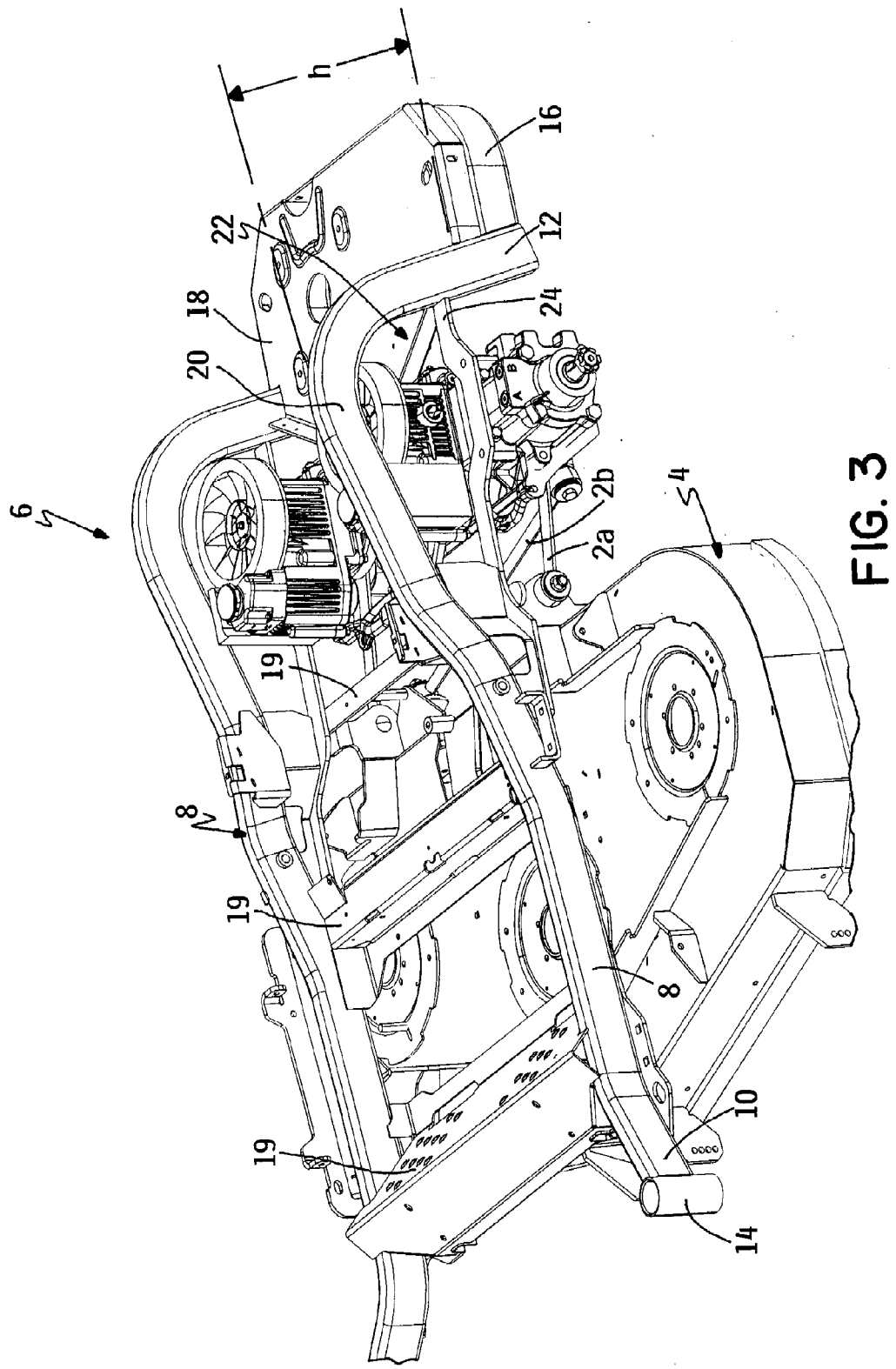
FIG. 3 is a perspective view of the portion of the mower and cutting deck shown in FIG. 2, particularly illustrating at least some of the struts of FIG. 2 from the left side of the mower.

Referring now to FIG. 3, frame 6 includes a pair of laterally spaced side rails 8. Side rail 8 is a continuous, one-piece, steel tube or beam all the way from its front end 10 to its rear end 12. This provides superior strength and simplicity in frame 6 compared to prior art mowers. A hub 14 is welded to front end 10 of side rail 8 to provide a vertical support for the vertical stem of a front caster wheel 7f.

Rear ends 12 of side rails 8 are joined and united together by a continuous, one-piece, rear rail 16. The opposite ends of rear rail 16 are welded to rear ends 12 of side rails 8. Rear rail 16 is U-shaped and extends rearwardly from rear ends 12 of side rails 8. An engine platform 18 for supporting a power source, such as internal combustion engine 9, is placed atop the U-shaped configuration of rear rail 16. Side rails 8 can also be joined and united by other transverse cross members 19.

Side rail 8 is generally flat or rises slightly over a front portion thereof, but then has a dramatic rise over the rear portion thereof followed by a sharp dropoff. The dramatic rise and sharp dropoff provides side rail 8 with a raised, asymmetrical arch 20 having a downwardly facing opening 22. A longitudinal frame member 24 spans across opening 22 to arch 20. The opposite ends of frame member 24 are fixed to side rail 8 on opposite sides of arch 20. Arch 20 has a significant height indicated at h in FIG. 3.

Figure 8:
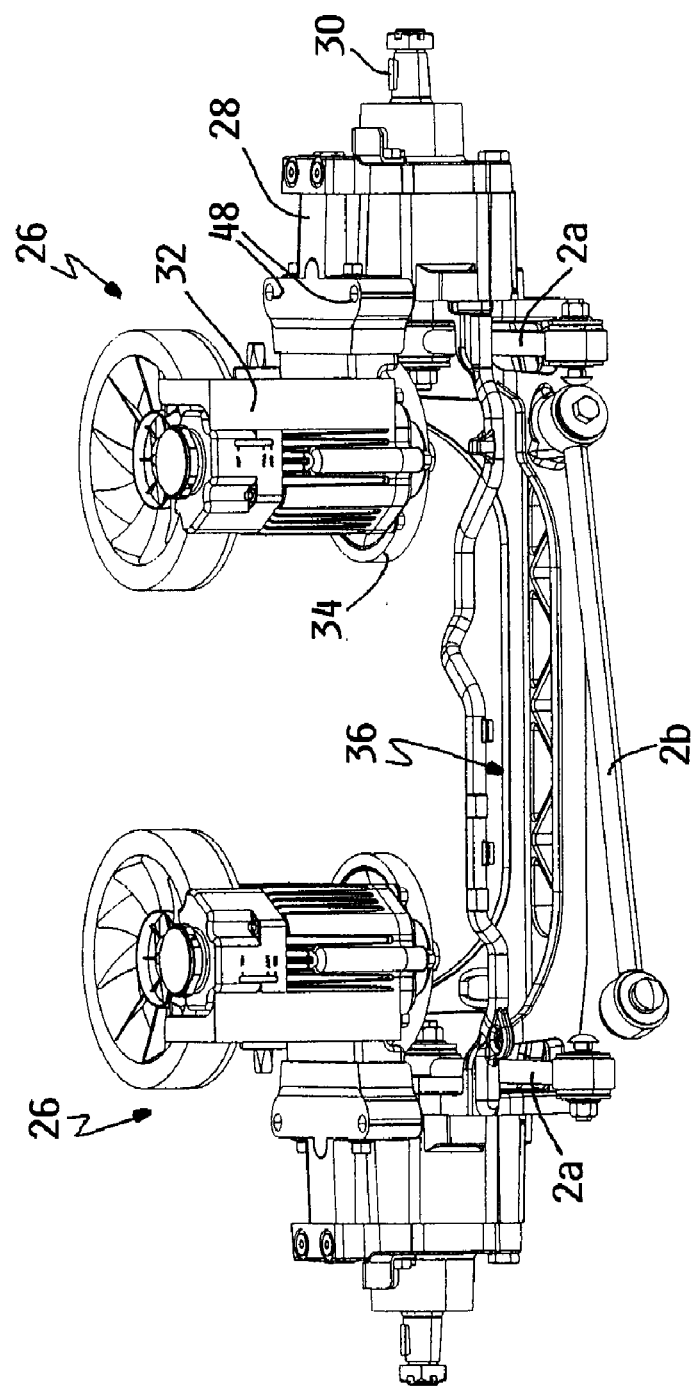
FIG. 8 is a perspective view of the struts of FIG. 2, particularly illustrating the struts attached to the cross brace that joins or unites the pump/motor assemblies.

Referring now to FIG. 8, two integrated hydraulic pump/motor assemblies 26 are used to power the mower in a ZRT fashion. Each assembly 26 comprises a hydraulic motor 28 having an output shaft 30 that is coupled to the hub of a ground engaging drive wheel 7r of the mower. A hydraulic pump 32 is integrally connected to motor 28 to be a part thereof, i.e. motor 28 and pump 32 comprise a single unit. Pump 32 is connected to the top of motor 28 and extends upwardly therefrom. Thus, pump/motor assembly 26 has a generally L-shaped configuration as best shown in FIG. 8. Each pump 32 is driven by a belt drive (not shown) from the engine of the mower to a pulley 34 located on the bottom of pump 32.

A cross brace 36 unites and joins pump/motor assemblies 26 together. Cross brace 36 is in the form of an elongated truss having a pair of parallel beams 38 bridged by integral reinforcing ribs 40 that are inclined relative to the axes of elongation of beams 38. See FIGS. 2 and 4. An upwardly extending cradle 42 is provided at each end of cross brace 36 with cradle 42 being joined to the adjacent ends of beams 38. See FIG. 5.

Figure 4:
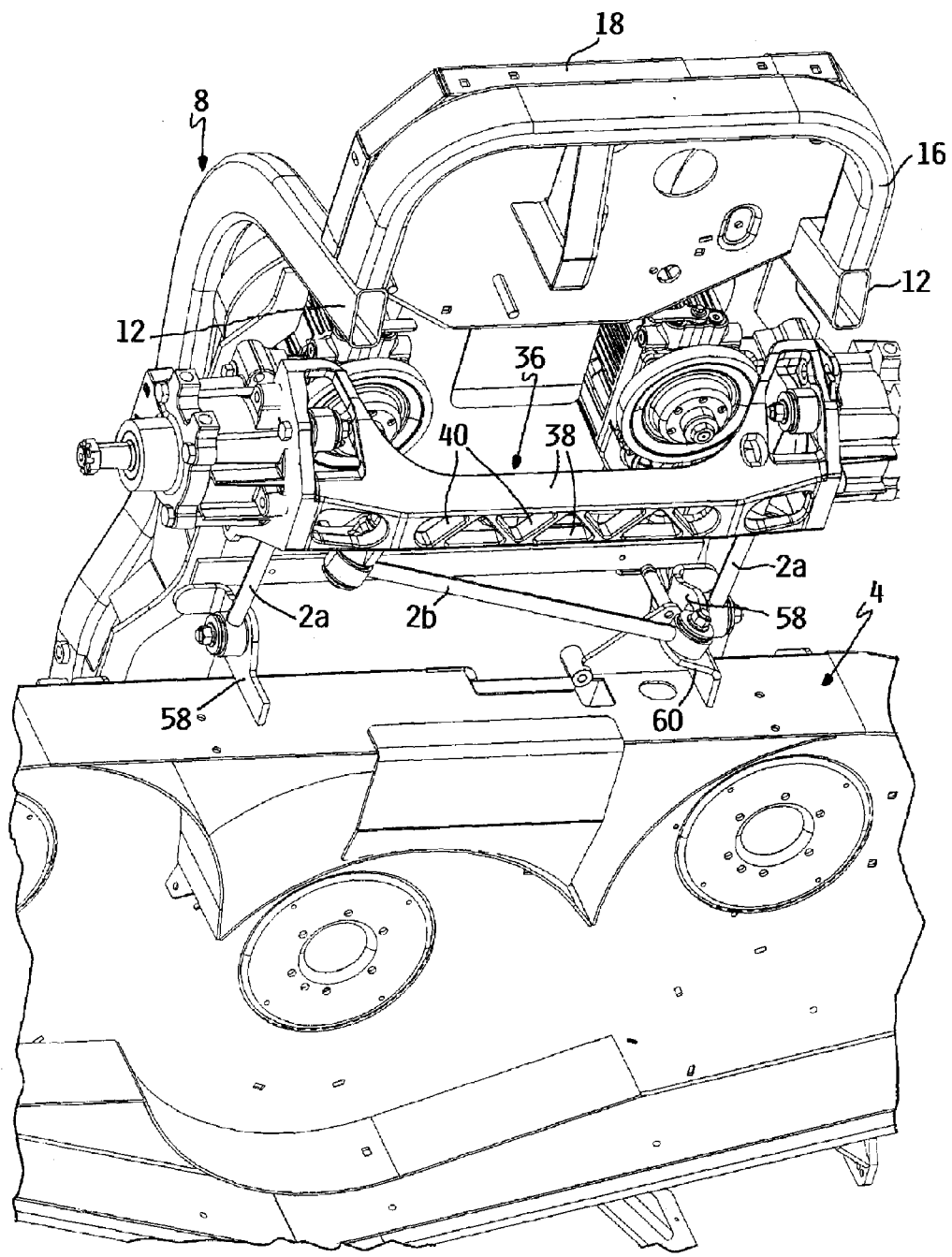
FIG. 4 is an enlarged perspective view of the struts of FIG. 2, particularly illustrating the struts extending between flanges on the rear of the cutting deck and a cross brace that extends between a pair of hydraulic pump/motor assemblies on opposite sides of the mower.
Figure 5:
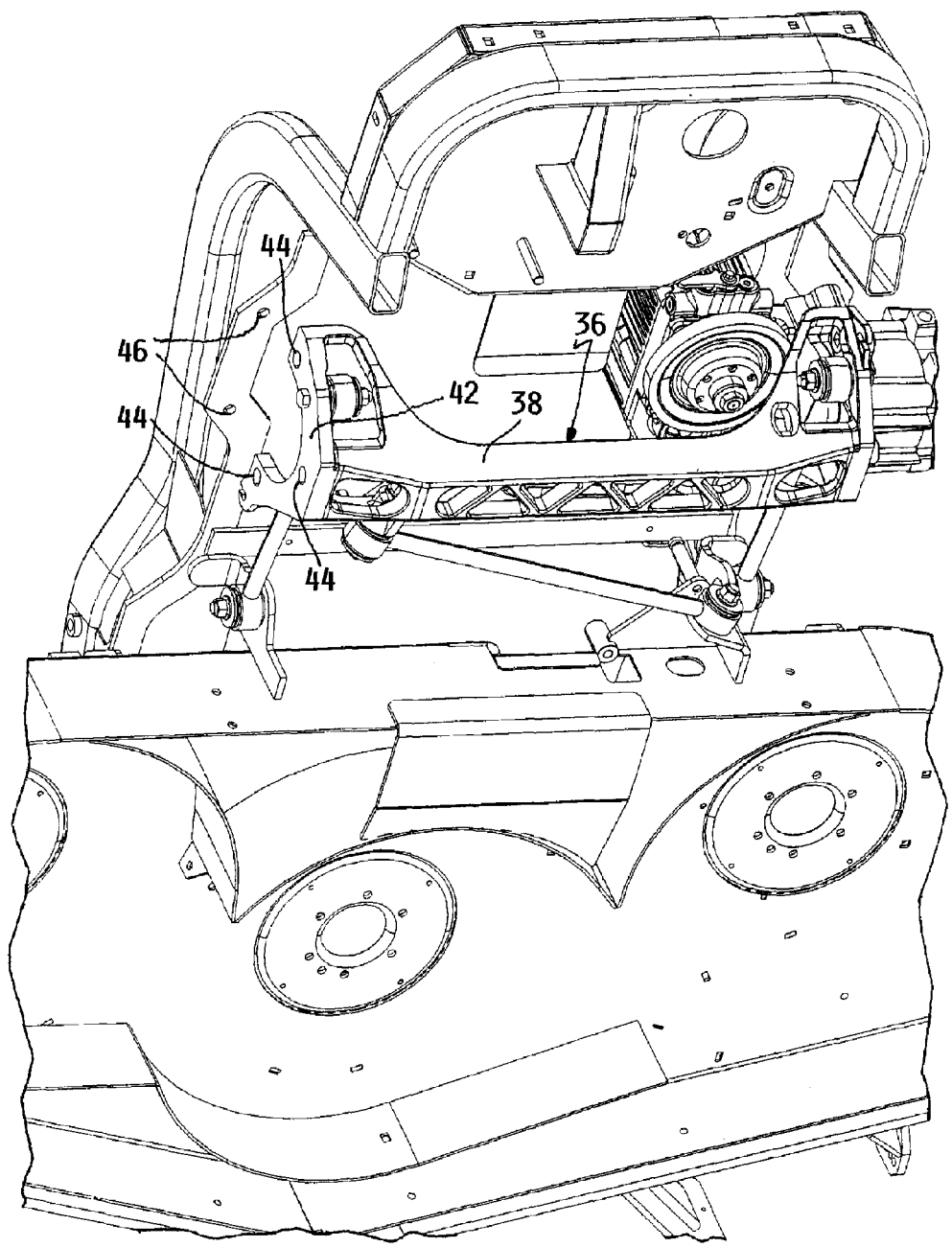
FIG. 5 is a perspective view similar to FIG. 4, particularly illustrating the struts with one of the pump/motor assemblies having been removed for the purpose of clarity.
Figure 6:
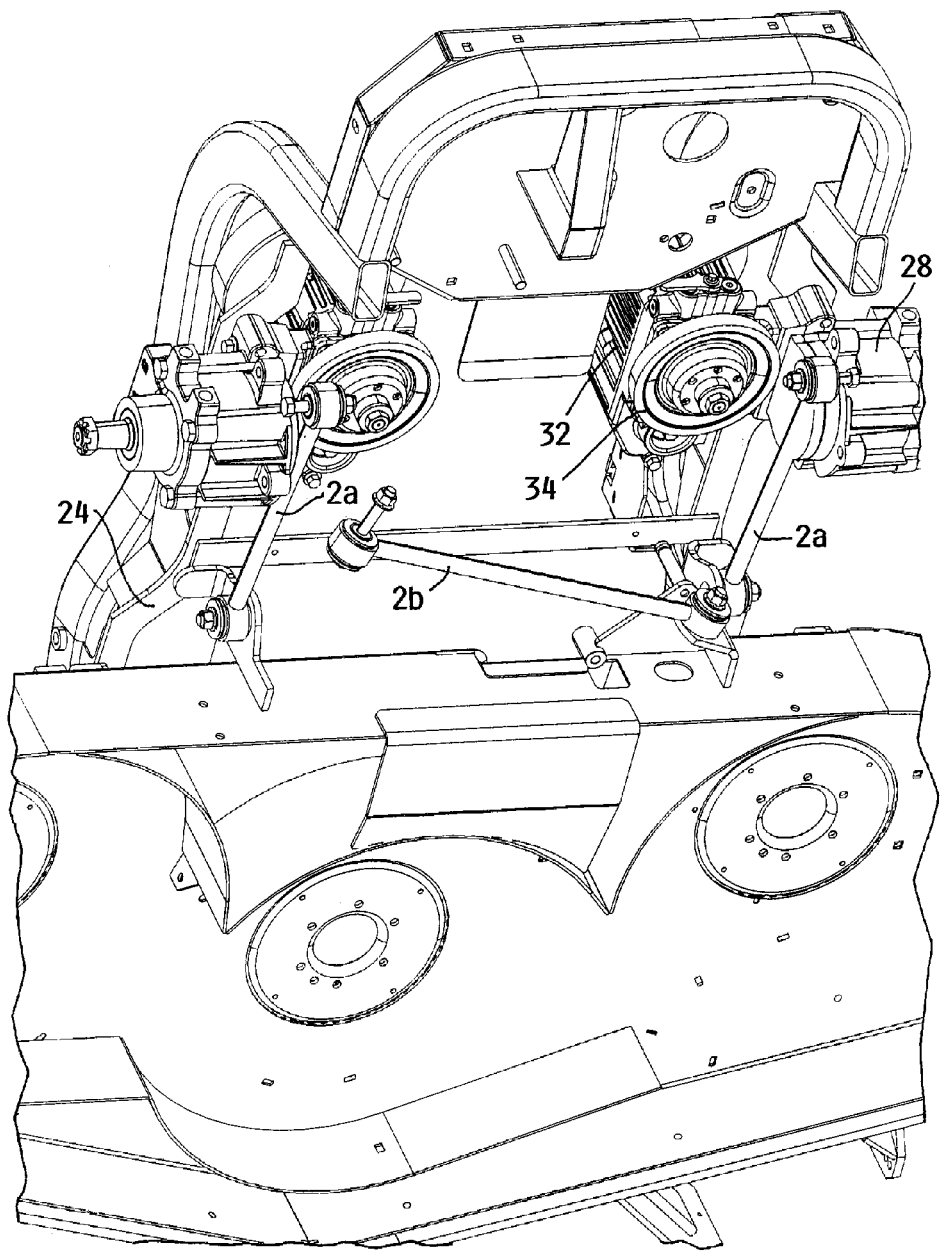
FIG. 6 is a perspective view similar to FIG. 4, particularly illustrating the struts with the cross brace having been removed for the purpose of clarity.

Cradle 42 at each side of cross brace 36 has a plurality of spaced apertures 44. This permits motor 28 in each pump/motor assembly 26 to be bolted thereto. As shown in FIG. 4, when so bolted, motor 28 is located laterally outside cross brace 36, but pump 32 in each pump/motor assembly 26 is located vertically above and overlies the adjacent end of cross brace 36 due to the L-shaped configuration of pump/motor assembly 26.

To attach each pump/motor assembly 26 to the mower, motor 28 in each assembly 26 is bolted to the longitudinal frame member 24 spanning arch 20 in side rails 8. As shown in FIG. 2, each longitudinal frame member 24 has a plurality of bolt holes 46 that will receive bolts (not shown) that extend through mating apertures 48 in motor 28. Mating apertures 48 in motor 28 are best shown in FIG. 8.

In any event, when the two motors 28 are bolted to the longitudinal frame members 24 on the opposite side rails 8, the pump/motor assemblies 26 will be carried on frame 6 with cross brace 36 extending laterally across frame 6. When so mounted, pumps 32 themselves will be inboard of side rails 8 and positioned within the vertical profile of arches 20 of side rails 8. In other words, pumps 32 will not vertically extend beyond the vertical height h of arches 20 in side rails 8 to be protected thereby and to provide a compact mounting of pumps 32. When so mounted, cross brace 36 that joins the pump/motor assemblies 26 will be quite low on the mower and approximately at the level of deck 4.

Struts 2 of this invention extend between cross brace 36 and the rear of deck 4. There are three struts 2, namely two longitudinal struts 2a that provide thrust to deck 4 in longitudinal forward or reverse directions and one lateral strut 2b that provides lateral stabilization to deck 4. Other strut combinations could be used as will be explained in more detail hereafter.

Figure 7:
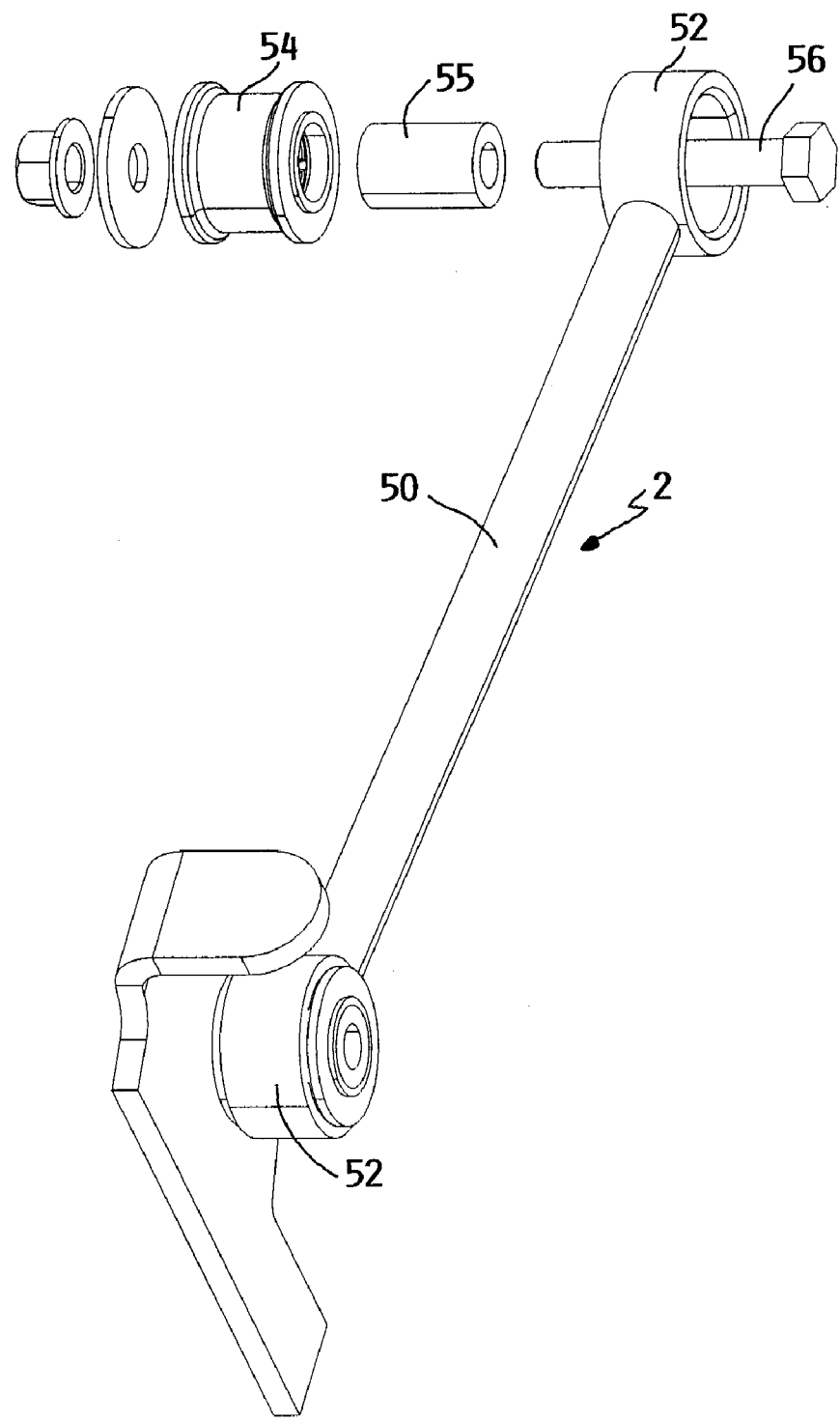
FIG. 7 is a perspective view of one of the struts of FIG. 2, particularly illustrating one end of the strut in an exploded configuration.

Referring now to FIG. 7, each strut 2 comprises a substantially solid, elongated rod or bar 50 having a pair of hubs 52 at either end. Hubs 52 are only slightly wider than the width of rod or bar 50. Hubs 52 enclose and support a rubber bushing 54. Bushing 54 is a compliant suspension bushing that is often used in automotive applications and is sometimes referred to as a Clevite bushing.

Hubs 52 at each end of rod or bar 50 are pivotally coupled to either deck 4 or cross brace 36 by pivot pins 56. Each pivot pin 56 passes through an inner pivot bushing 55 that will be rigidly clamped in place inside hub 52 when the nut 57 on the end of pivot pin 56 is tightened against some portion of deck 4 or cross brace 36. Rubber bushing 54 will concentrically surround inner pivot bushing 55 when the pivot connection formed thereby is assembled together around pivot pin 56. Rubber bushings 54 allow spherical or three axis motion of hubs 52 relative to pivot pins 56 and relative to pivot bushings 55 to minimize wear on hubs 52, pivot bushings 55, and pins 56.

For the two longitudinal struts 2a, hubs 52 at the rear thereof are pivotally connected to cross brace 36 at the rear of cross brace 36, namely at positions underlying the rear ends of pumps 32 in each of the pump/motor assemblies 26. Hubs 52 at the front thereof connect to simple vertical flanges 58 at the rear of deck 4. Significantly, the use of a wide elongated sleeve at the front end of strut 2a coupled between a forked bracket on deck 4 is no longer used on struts 2a. The disclosed hubs 52 at the front end of longitudinal struts 2a and rubber bushings 54 therein provide much better wear than the prior art design. However, due to the change in the front ends of struts 2a and how they connect to deck 4 as compared to the prior art, struts 2a no longer provide lateral stabilization for deck 4.

The lateral strut 2b is used to provide such lateral stabilization. Again, hub 52 at the rear of lateral strut 2b is pivotally connected to cross brace 36, but this time to the front of cross brace 36. Lateral strut 2b extends to the side and somewhat forwardly with hub 52 at the front of lateral strut 2b being connected to a flange 60 on the rear of deck 4. Flange 60 is inclined to match the angle of inclination of strut 2b as strut 2b extends to the side and forwardly. See FIGS. 2 and 5. Lateral strut 2b has the same simple and durable design as the longitudinal struts 2a, namely a solid rod or bar 50 with rubber bushings 54 contained in hubs 52 at either end.

In the operation of deck 4, longitudinal struts 2a provide fore and aft propulsive force and further stabilize deck 4 against yaw (rotation of deck 4 about a vertical axis through deck 4). Lateral strut 2b provides lateral or side-to-side stability for deck 4. Struts 2a and 2b wear less than prior art strut designs but are effective in providing deck propulsion and in laterally locating and stabilizing deck 4 on frame 6. For example, the loading on each individual strut 2 is virtually all along the length of strut 2 without any significant side loads being imposed on strut 2 or rubber bushings 54 inside hubs 52 of strut 2. This is a factor in the improved wear and performance characteristics of struts 2. This is advantageous.

In addition, struts 2 of this invention are considerably quieter than prior art strut designs. Rubber bushings 54 comprise an elastomeric cushion in the pivot connections of struts 2 to deck 4 and to cross brace 36 rather than simply having a solid pivot pin connection. Thus, the noise generated by prior art solid pivot pin connections will be largely absent due to the noise absorbing and deadening characteristics of bushings 54. This is a further advantage.

Moreover, struts 2 with rubber bushings 54 allow deck 4 to twist and move in various ways while conforming to such movement along any axis. For example, if just one side of the deck moves up such that deck 4 becomes canted or tilted from side to side, the strut 2 on the raised side can tilt or twist as needed to accommodate this motion due to the spherical motion allowed by rubber bushing 54. The three degrees of freedom provided by bushings 54 allow either end of each strut 2 to move in any required direction as the mower is operated. In addition, struts 2 allow deck 4 to move vertically up and down as the height of cut is adjusted over the entire range of height of cut adjustment.

Rubber bushings 54 also serve as shock absorbing members interposed between deck 4 and frame 6 of the mower. In this capacity, bushings 54 help absorb vibration from deck 4 and prevent or lessen the degree to which such vibration is transferred to frame 6. Similarly, bushings 54 help absorb transient shock loads on deck 5, such as those occurring from deck impacts against an object, and attenuate the severity of such shock loads on frame 6. This helps increase operator comfort.

Rubber bushings 54 could be replaced by spherical ball joints and struts 2 with such ball joints would provide the same ability to move in three degrees of freedom as when bushings 54 were used. However, such ball joints are not preferred for use in struts 2 since they would not provide the sound reduction and vibration and shock load attenuation also provided by bushings 54.

Various alternative strut configurations could be used. For example, a pair of lateral struts 2b could be used instead of a single lateral strut 2b. Or, two lateral struts 2b and one longitudinal strut 2a could be used. Or, longitudinal struts 2b could themselves be canted or angled somewhat in a lateral direction as they extend fore and aft. A three strut configuration is preferred with at least one strut extending generally longitudinally relative to deck to propel deck 4 and at least one strut extending generally laterally relative to deck 4 to laterally stabilize deck 4.

Various other modifications of this invention will be apparent to those skilled in the art. Thus, the scope of the invention shall be limited only by the appended claims.

We claim:

1. An improved mower of the type having a mower frame, a rotary cutting deck carried by the frame, and a plurality of struts for propelling the deck from the frame, wherein the improvement relates to the struts and comprises:
    (a) a pair of laterally spaced struts having opposite first and second ends, wherein a first end of each strut is pivotally connected to the frame by a first pivot connection and a second end of each strut is pivotally connected to the deck by a second pivot connection, and wherein the first and second pivot connections of each strut are longitudinally spaced apart relative to a forward direction of motion of the frame;
    (b) a third strut having opposite first and second ends, wherein a first end of the third strut is pivotally connected to the frame by a first pivot connection and a second end of the third strut is pivotally connected to the deck by a second pivot connection, and wherein the first and second pivot connections of each strut are laterally spaced apart on the frame; and
    (c) an elastomeric member in at least one of the pivot connections of each strut for attenuating transmission of motion of the deck to the frame.

2. The mower of claim 1, wherein the at least one pivot connection comprises a pivot pin passing through a bore, and wherein the elastomeric member concentrically surrounds the pivot pin.

3. The mower of claim 2, wherein the elastomeric member is received within the bore when it concentrically surrounds the pivot pin.

4. An improved mower of the type having a mower frame, a rotary cutting deck carried by the frame, and a plurality of struts extending between the deck and the frame, wherein the improvement relates to the struts and comprises:
    (a) at least one generally longitudinally extending strut having opposite first and second ends, wherein a first end of each longitudinal strut is pivotally connected to the frame by a first pivot connection and a second end of each longitudinal strut is pivotally connected to the deck by a second pivot connection, and wherein the first and second pivot connections of each longitudinal strut are longitudinally spaced apart relative to a forward direction of motion of the frame such that each longitudinal strut propels the deck in forward and reverse directions from forward and reverse movement of the frame;
    (b) at least one generally laterally extending strut having opposite first and second ends, wherein a first end of each lateral strut is pivotally connected to the frame by a first pivot connection and a second end of each lateral strut is pivotally connected to the deck by a second pivot connection, and wherein the first and second pivotal connections of each lateral strut are laterally spaced apart relative to the frame to laterally stabilize the deck on the frame; and
    (c) an elastomeric member in at least one of the pivot connections of each strut.

5. The mower of claim 4, further including an elastomeric member in each of the pivot connections of each strut.

6. An improved mower of the type having a mower frame, a rotary cutting deck carried by the frame, and a plurality of struts extending between the deck and the frame, wherein the improvement relates to the struts and comprises:
    (a) at least three struts extending between the deck and the frame, wherein at least one strut extends sufficiently longitudinally between the deck and the frame to propel the deck in forward and reverse directions as the frame moves in forward and reverse directions, and wherein at least one strut extends sufficiently laterally between the deck and the frame to stabilize the deck against lateral motion relative to the frame; and
    (b) wherein at least one end of each strut includes a pivot connection permitting movement of the strut along three axes at the one end of the strut.

7. The mower of claim 6, wherein both ends of each strut include a pivot connection permitting movement of the strut along three axes at both ends of the strut.

8. The mower of claim 7, wherein each pivot connection includes an elastomeric member that provides motion along the three axes, and wherein the elastomeric member is sufficiently soft to further attenuate transmission of motion from the deck to the frame.

9. The mower of claim 8, wherein the elastomeric member comprises a rubber bushing.

* * * * *